US006911149B2

(12) United States Patent
Hansen et al.

(10) Patent No.: US 6,911,149 B2
(45) Date of Patent: Jun. 28, 2005

(54) INDUCED SLUDGE BED ANAEROBIC REACTOR

(75) Inventors: Conly L. Hansen, North Logan, UT (US); Carl S. Hansen, Garland, UT (US)

(73) Assignee: Utah State University, North Logan, UT (US)

( * ) Notice: Subject to any disclaimer, the term of this patent is extended or adjusted under 35 U.S.C. 154(b) by 62 days.

(21) Appl. No.: 10/325,634

(22) Filed: Dec. 18, 2002

(65) Prior Publication Data

US 2003/0141244 A1 Jul. 31, 2003

Related U.S. Application Data

(60) Provisional application No. 60/343,017, filed on Dec. 19, 2001.

(51) Int. Cl.[7] .................................................. C02F 3/28
(52) U.S. Cl. ...................................... 210/603; 210/608
(58) Field of Search ............................... 210/603, 608, 210/614, 629, 143, 252, 522, 523, 525

(56) References Cited

U.S. PATENT DOCUMENTS

| 2,889,929 A | * | 6/1959 | Kivell | 210/194 |
|---|---|---|---|---|
| 3,622,009 A | * | 11/1971 | Bordner | 210/528 |
| 3,705,648 A | * | 12/1972 | Arvanitakis | 210/744 |
| 3,837,493 A | * | 9/1974 | Lin | 210/197 |
| 3,965,013 A | * | 6/1976 | Jackson | 210/519 |
| 4,208,279 A | * | 6/1980 | Varani | 210/613 |
| 4,302,329 A | * | 11/1981 | Pfefferkorn | 210/97 |
| 4,350,588 A | * | 9/1982 | Tsubota | 210/208 |
| 5,441,634 A | * | 8/1995 | Edwards | 210/194 |
| 5,529,692 A | * | 6/1996 | Kubler | 210/603 |
| 5,747,311 A | * | 5/1998 | Jewell | 435/176 |
| 5,798,043 A | * | 8/1998 | Khudenko | 210/603 |
| 5,866,002 A | * | 2/1999 | Yates et al. | 210/601 |

\* cited by examiner

*Primary Examiner*—Fred G. Prince
(74) *Attorney, Agent, or Firm*—Holland & Hart

(57) ABSTRACT

An induced sludge bed anaerobic reactor includes a vessel in which a septum or other partition is positioned to maintain solids in wastewater being treated toward a lower zone in the reactor. A central aperture is formed in the septum into which a sludge blanket control mechanism, such as an auger, is positioned to force solids to the lower zone of the reactor or, alternatively, pull solids up above the septum so that they can be removed from the vessel, if desired. A mixer may be utilized in connection with the bioreactor to mix the contents and prevent a crust from forming at the top of the bioreactor. Still further, a wall may be positioned to extend above the septum around its perimeter to assist in separating solids from the wastewater. The various types of bacteria used in the anaerobic process may also be separated, according to the present invention, in either a single vessel or multiple vessels so that the conditions of each respective vessel can be altered as desired.

32 Claims, 8 Drawing Sheets

INDUCED SLUDGE BED ANAEROBIC REACTOR

RELATED APPLICATION

This application claims priority, under 35 U.S.C. § 119(e), from U.S. Provisional patent application Ser. No. 60/343,017, filed on Dec. 19, 2001, entitled "Induced Sludge Bed Anaerobic Reactor."

FIELD OF THE INVENTION

This invention relates to anaerobic digestion of wastewater. More particularly, this invention relates to processes and devices to induce and control a sludge bed within an anaerobic reactor to enhance and improve the anaerobic digestion process.

BACKGROUND OF THE INVENTION

Wastewater treatment has always been important, particularly in agricultural production and food processing, which produces wastewater containing high concentrations of organic matter.

Anaerobic digestion is one traditional method of treating wastewater containing high concentrations of organic matter. Through anaerobic digestion, large quantities of organic matter are removed from the wastewater by converting the organic matter into biogas. Anaerobic digestion is particularly suitable for wastewater containing high concentrations of organics, such as wastewater generated through agricultural production and processing.

Inducing a sludge blanket or sludge bed (the terms "bed" and "blanket" are used interchangeably throughout this disclosure) has long been recognized as a way to promote anaerobic digestion. A sludge blanket is used to retain anaerobic bacteria in a designated space. One prior method of establishing such a sludge bed is to utilize a so-called upflow anaerobic sludge blanket (UASB), which causes a sludge blanket to form over time inside a bioreactor. There are many problems, however, with respect to prior UASBs. For example, it may take an extended period of time before the sludge blanket forms in a UASB. Traditional UASB bioreactors further do not have a method for controlling the formation of a sludge blanket within the reactor such that the sludge blanket may become too thick or otherwise less effective to carry out anaerobic digestion. Perhaps the biggest problem with traditional UASB bioreactors relates to plugging, which can be particularly problematic when treating wastewater containing significant amounts of solids, such as animal wastewater.

Still others have developed bioreactors wherein relatively high concentrations of bacteria are maintained by adding fixed media, such as plastic rings or rocks, which provide locations to which the bacteria can attach. Unfortunately, these prior types of bioreactors also plug often when treating substrates like animal manure and various kinds of food processing wastes.

There is a need, therefore, to provide a bioreactor that quickly forms a sludge blanket within the bioreactor. There is also a need to provide a bioreactor that can control the density of the sludge blanket to keep the bioreactor from plugging.

Still another need exists to provide a bioreactor that has the ability to separate the various types of bacteria needed for the anaerobic breakdown of organics by forming gradients in a single sludge blanket reactor by providing separate tanks for the various stages of anaerobic digestion. Yet another need exists to provide a bioreactor that includes a device to assist in separating settling solids from the liquid or wastewater in which the settling solids are suspended.

SUMMARY OF THE INVENTION

The present invention relates to method and apparatuses for inducing and controlling a sludge blanket within an anaerobic reactor. In one embodiment, a rigid or semi-rigid partition or septum is positioned inside an enclosed bioreactor vessel. The septum tends to hold solids down or at least contain solid particles in the bottom zone of the bioreactor. The partition or septum may slope upwardly from the sides of the vessel toward a central aperture or hole so that biogas produced below the partition can move along the bottom of the septum and escape into the top of the tank where it can be removed. In addition, a sludge blanket control mechanism may be incorporated into the invention to force solids down below or pull solids above the partition or septum to control the amounts of solids retained in the bioreactor vessel. In one embodiment, the sludge blanket control mechanism comprises an auger with sloping fins to move solids from just above the hole in the septum downward to some distance beyond the bottom of the hole toward a lower zone in the bioreactor. Alternatively, the auger can pull sludge up through the hole and above the septum where the sludge can be removed from the vessel. Still further, a mixer may be attached to the shaft of the auger to mix the bioreactor contents and prevent a crust from forming at the top of the bioreactor. Also, a separator in the form of a weir wall may be incorporated into the vessel so that it extends above the septum and assists in separating solids from the wastewater being treated.

Yet another aspect of the invention involves using a single bioreactor or a plurality of bioreactors in connection with the present invention to further enhance separation. More specifically, a plurality of gradients in the sludge blanket may be formed in a single tank according to the various types of bacteria required for the stages of hydrolysis, acidogenesis, and methanogenesis in the anaerobic digestion process. Alternatively, multiple tanks may be utilized so that conditions in each tank can be adjusted according to the particular step being performed.

The foregoing and other features, utilities, and advantages of the invention will be apparent from the following detailed description of the invention with reference to the accompanying drawings.

DETAILED DESCRIPTION OF THE INVENTION

The present invention relates to an anaerobic reactor 10 comprising an enclosure or vessel in which wastewater containing high concentrations of organic matter is introduced for treatment. An anaerobic reactor 10 according to the present invention is particularly applicable to wastewater generated through agricultural production and food processing.

In the anaerobic digestion process, bacteria convert carbon containing waste products, such as byproducts of farming, ranching, or food processing, into primarily biogas that is similar to natural gas. Suspended growth anaerobic digesters, such as lagoons or enclosed vessels, that are mixed and heated do not retain bacteria. Therefore, the rate of treatment depends on how fast the bacteria can grow.

An induced blanket bioreactor (IBR) quickly forms a sludge blanket or bed within the bioreactor. It is to be understood that the terms "sludge blanket" are synonymous and interchangeable with the terms "sludge bed." A sludge blanket refers to a zone or designated space within the bioreactor that is thick with solids. The sludge blanket initially consists of various types of solid particles naturally found in waste, such as undigested feed or pieces of bedding. A sludge blanket of this type is a haven for bacteria. The bacteria will attach to the particles of waste in the wastewater.

If the sludge blanket is controlled properly, the particles will grow without being flushed out of the bioreactor. Also, if the sludge blanket is managed properly, it will evolve to comprise mostly living bacteria, being made up of floating solids that trap bacteria. Where the solids, which consist mostly of living bacteria, are trapped in a zone, they multiply and consume the solid, non-living material that initially makes the blanket or that flows into the blanket. Without some type of sludge bed control mechanism, however, the wastewater passing through a continuously fed bioreactor would transport bacteria out of the bioreactor with the effluent. This is not desirable because a high concentration of bacteria is necessary to effectively destroy organic matter in the wastewater.

Prior bioreactors have been developed to provide a high concentration of bacteria to enhance the anaerobic digestion process. These prior bioreactors have added a fixed media, such as plastic rings or rocks, so that the bacteria have something to which they can attach. A drawback of these prior bioreactors, however, is that they soon plug when treating substrates, such as animal manure and many kinds of food processing wastes. They also employ no mechanism to control formation of the sludge blanket.

Figure 1:
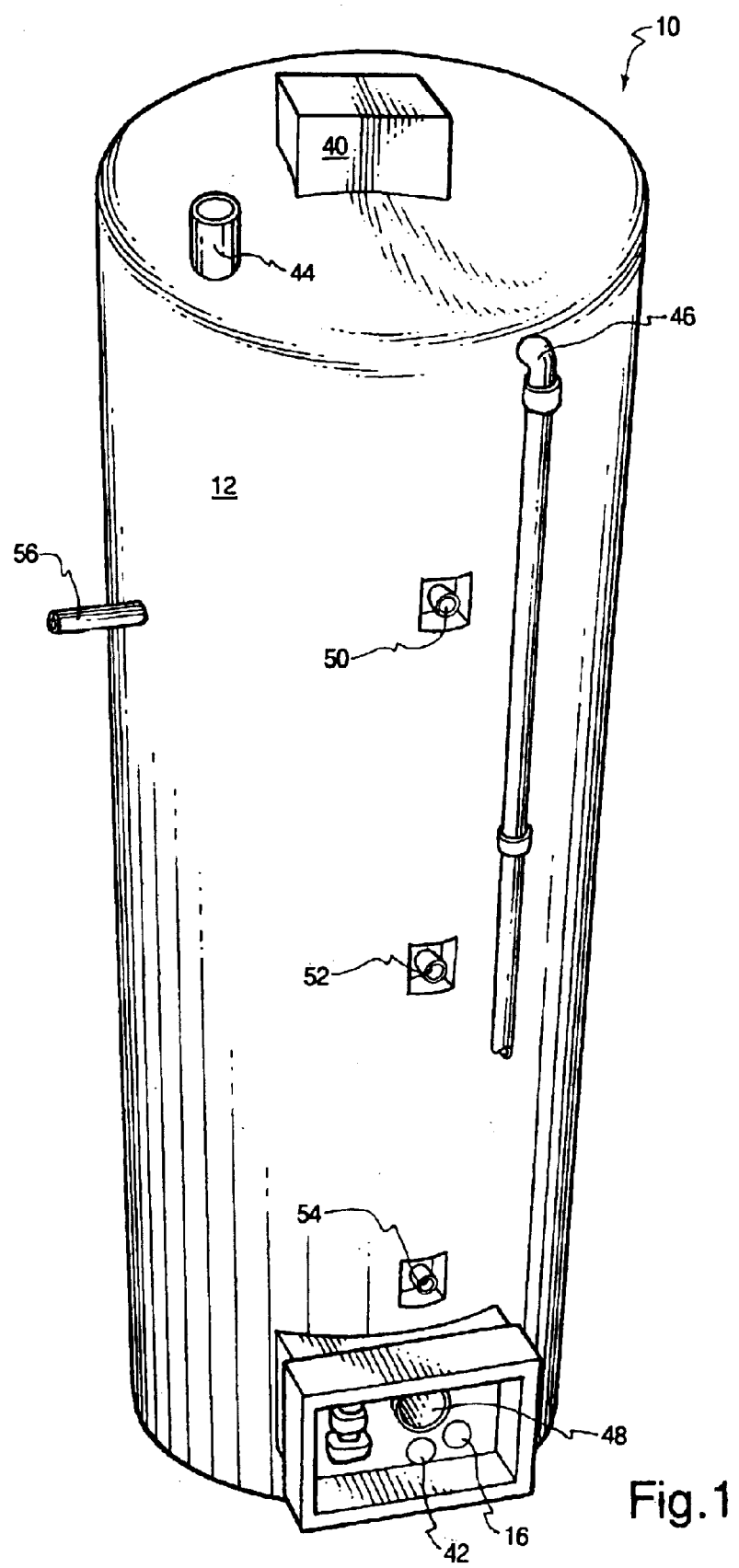
FIG. 1 is a perspective view of a bioreactor according to the present invention.
Figure 2:
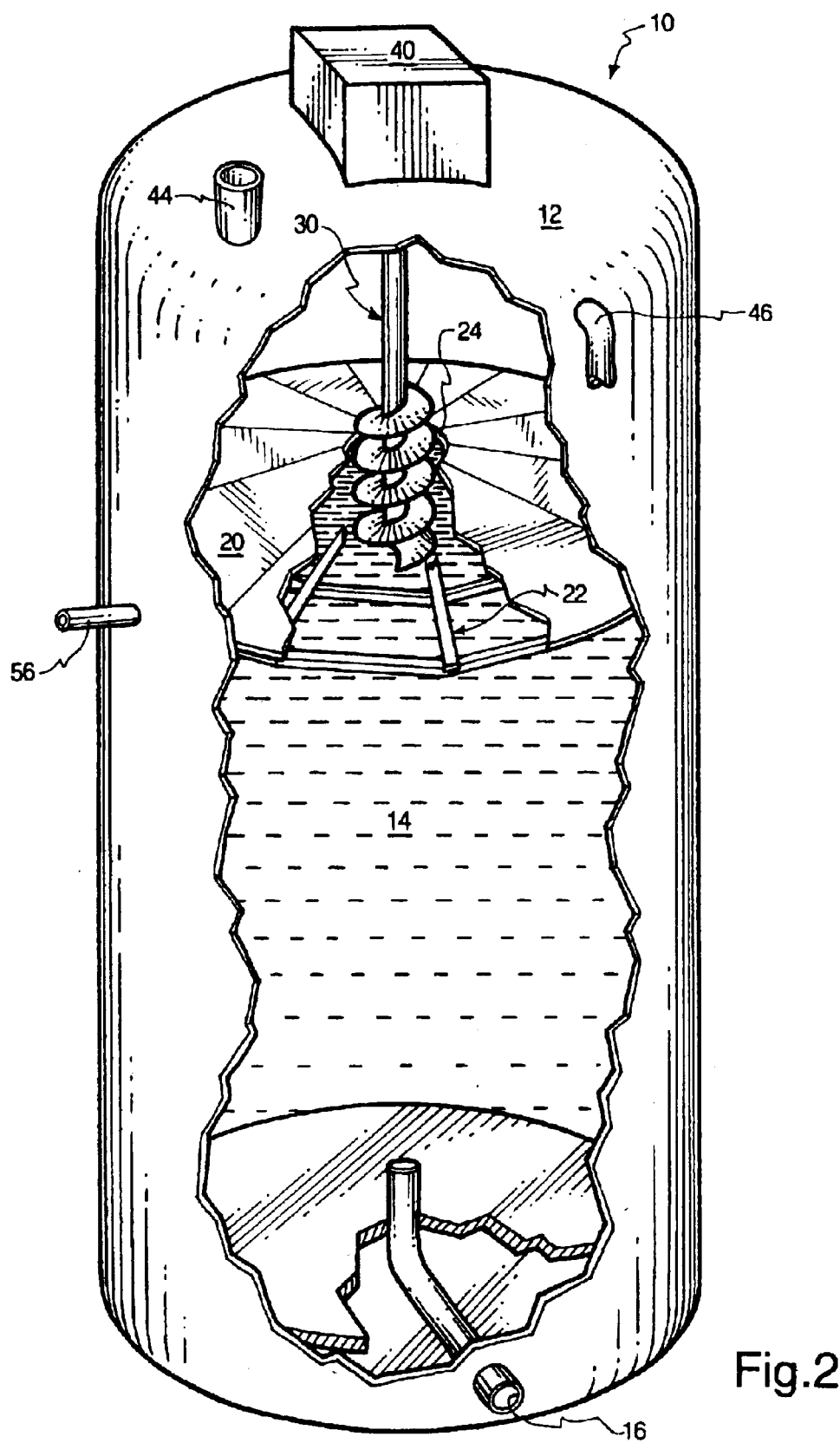
FIG. 2 is a front elevation view, including a broken away portion showing interior portions, of the bioreactor of FIG. 1.
Figure 3:
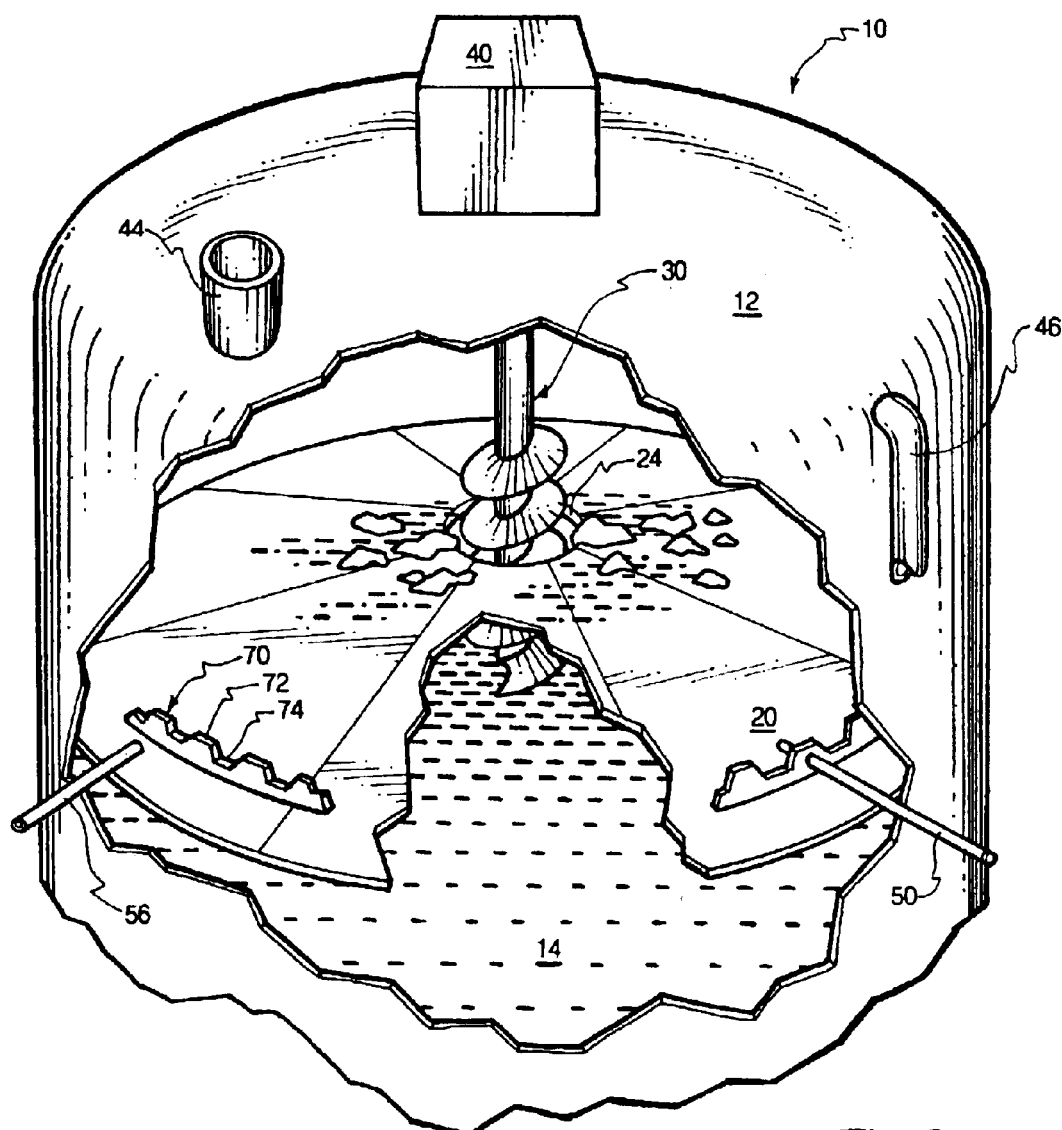
FIG. 3 is a partial perspective view showing the interior of the bioreactor including the sludge blanket control mechanism of the present invention.
Figure 4:
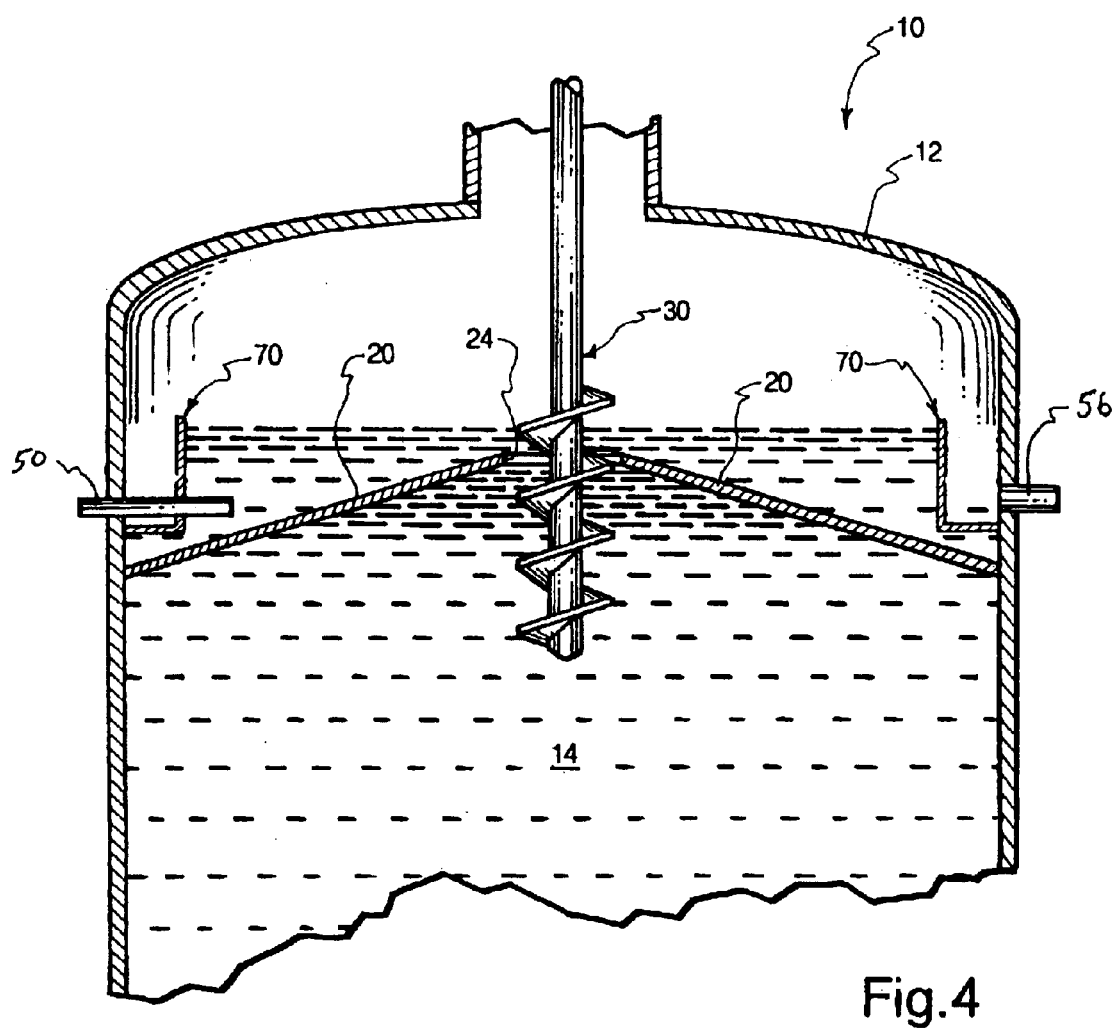
FIG. 4 is a partial sectional side elevation view of the bioreactor of FIG. 1 showing a weir wall secured to the walls of the bioreactor vessel.

Referring to FIGS. 1–3, the bioreactor 10 comprises a vessel or tank 12 which essentially comprises a cylindrical upstanding tank. The vessel 12 may be made of any suitable material, including but not limited to steel, plastic, or concrete. The vessel 12 provides an enclosure in which wastewater 14 is held. The vessel 12 is preferably round in cross section and two to five times taller than the diameter.

The wastewater to be treated in vessel 12 may comprise any type of waste products, such as byproducts of farming, ranching, food processing, or any other type of wastewater that contains high concentrations of organic matter. The wastewater 14 is introduced into the central, bottom of vessel 12 through an inlet 16 (FIGS. 1 and 2). In one embodiment, the wastewater is introduced into the vessel 12 at a rate of approximately 10 gallons/minute.

As shown in FIGS. 2–6, a partition or septum 20 is positioned within or otherwise secured to the inside of the vessel 12 approximately two-thirds of the way up in vessel 12. The septum may be rigid or semi-rigid, and may comprise any suitable material, such as plastic, metal, or the like. Those skilled in the art will understand suitable materials for constructing the septum or partition 20. It is also to be understood that the septum 20 may comprise a plurality of panels, or may comprise a single, unitary piece of material. In one embodiment, the septum 20 is mounted inside of vessel 12 by a frame 22 which extends radially inwardly from the walls of vessel 12 toward the center of the vessel. Alternatively, the septum may itself be structurally sufficient to be secured to the inside of vessel 12 without a frame 22. The septum may slope upwardly from the vessel sidewalls toward a central aperture 24. In one embodiment, the volume above the septum will be approximately one-third or less than the total volume of the bioreactor. The central aperture or hole 24 in the septum 20 will be approximately six inches, or approximately $\frac{1}{10}$ to $\frac{1}{20}$ of the diameter of the septum 20. The septum will further have approximately a one foot rise from the outer diameter of vessel 12 to the central aperture 24. The upwardly sloping bottom surface of septum 20 allows biogas to rise to the top of the vessel 12 where it can be removed.

A sludge bed control device 30 is operatively coupled to the enclosure 12 and positioned within central aperture 24 in the septum 20. In one embodiment, the sludge blanket control mechanism is an auger 30 which will include sloping fins 32 (one continuously spiraling fin 32 is shown). When rotated clockwise, the auger 30 tends to force solids down toward a lower zone in vessel 12, or at least contain solid particles in the bottom zone of the bioreactor to promote the anaerobic digestion process. If the central aperture 24 becomes clogged or the wastewater 14 becomes too thick, the auger can be rotated counterclockwise to move particles up above the septum to clean out the central aperture 24. The auger 30 moves relatively thicker portions of the sludge blanket to the top of the partition or septum 20 where they can be taken out of the induced blanket reactor.

The sludge blanket control mechanism 30 is provided to help form and maintain the sludge blanket or sludge bed held below the septum 20 to hold anaerobic bacteria within the bioreactor. By retaining the anaerobic bacteria within the sludge blanket area, there remain more bacteria for breakdown of the organics in a waste stream. By utilizing the sludge blanket control mechanism, wastewater can be treated much faster and much more efficiently in the apparatus described in connection with the present invention as compared to other prior bioreactors. This reduces capital costs, management required, and makes it easier to build and scale up. In one experimental use involving pig waste, treatment of the sludge blanket occurred approximately three to eight times faster than commonly used methods. The present invention also makes it much easier for an inexperienced operator to manage the anaerobic digester without having to know how the anaerobic digester actually works.

The auger 30 comprises a shaft 34 which is rotated by a motor or other type of drive mechanism (not shown) held inside a housing 40 (FIGS. 1 and 2). Housing 40 may also provide access to the interior of the bioreactor 10 to remove sludge, if desired, from the top of septum 20 (see FIG. 3).

With reference to FIG. 1, several different ports may be provided in the bioreactor 10. When sludge builds up toward the bottom of the bioreactor, a port 42 is provided for cleaning out unwanted, settled-out sludge. A top access port 44 (which may be of any suitable size) may be provided at the top of vessel 12 for added accessibility to the top of the enclosure. A vent 46 formed at the top of vessel 12 may be utilized to remove biogas generated within the bioreactor 10. A lower access port 48 (closed during normal operation), which can be of any suitable size, may be provided toward the lower end of the vessel 12 for access to the lower portion of vessel 12. A recirculation port 50 may be provided to redirect sludge or other wastewater above septum 20 to the lower portion or lower zone of the vessel 12, either through inlet 16 or through another return line (not shown). In the embodiments where a weir wall 70 (explained below) is utilized, the recirculation port 50 will extend through the weir wall so that it can access the area above septum 20 and inside weir wall 70 (FIGS. 3, 4, 6, and 8). Test ports 52, 54 may be provided to test the wastewater or sludge bed at any number of locations relative to the vertical orientation of the tank. An effluent port 56 may be provided to remove water that has passed through the continuously fed bioreactor. Preferably, water passing through effluent port 56 will be treated wastewater that contains little or no bacteria. Those skilled in the art will understand that any number of other ports may be utilized in connection with the present invention without departing from the scope or spirit thereof.

Figure 5:
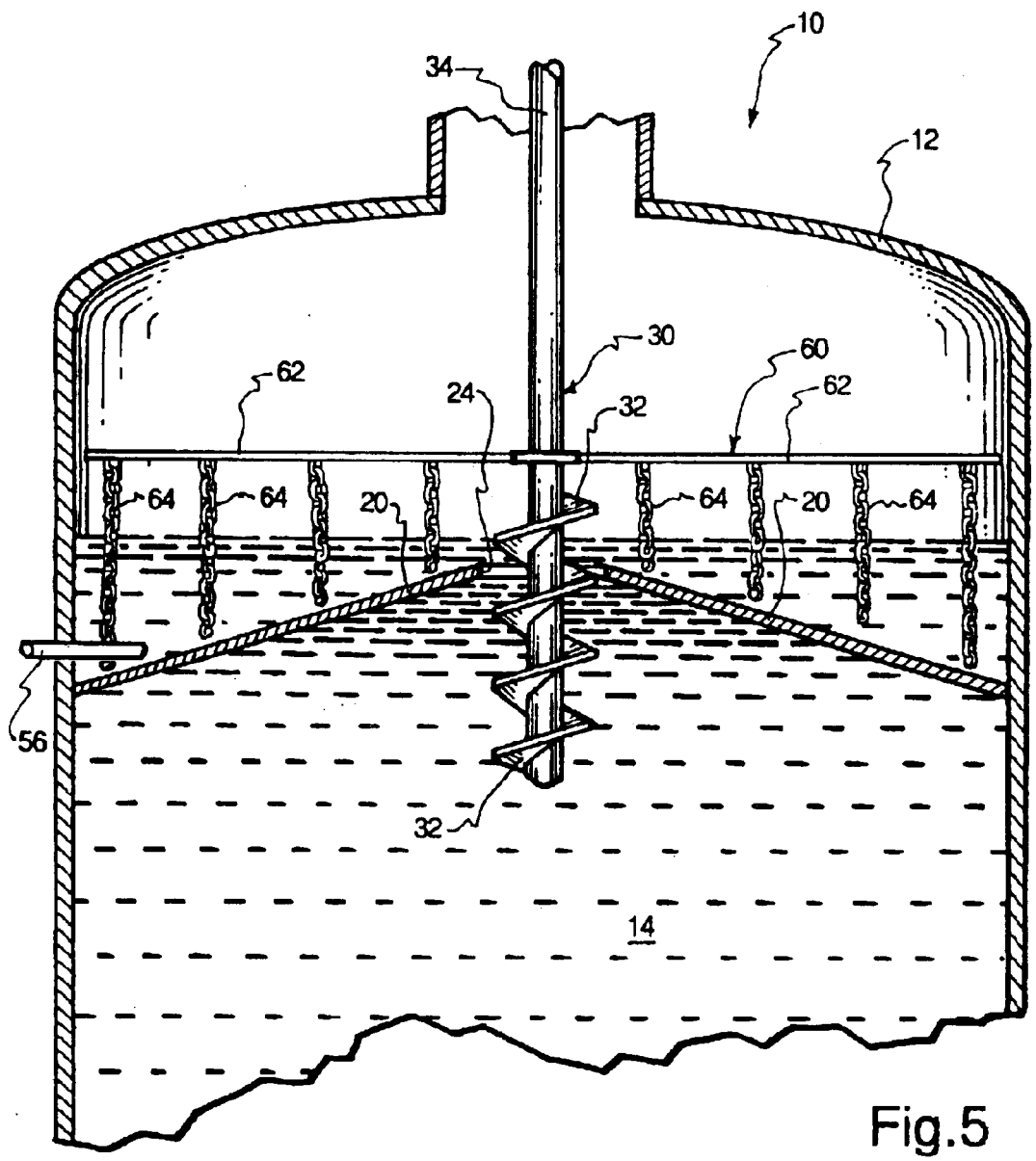
FIG. 5 is a partial sectional side elevation view of the bioreactor of FIG. 1 showing an alternative embodiment that includes a mixer to keep a crust from forming on top of the sludge bed.
Figure 6:
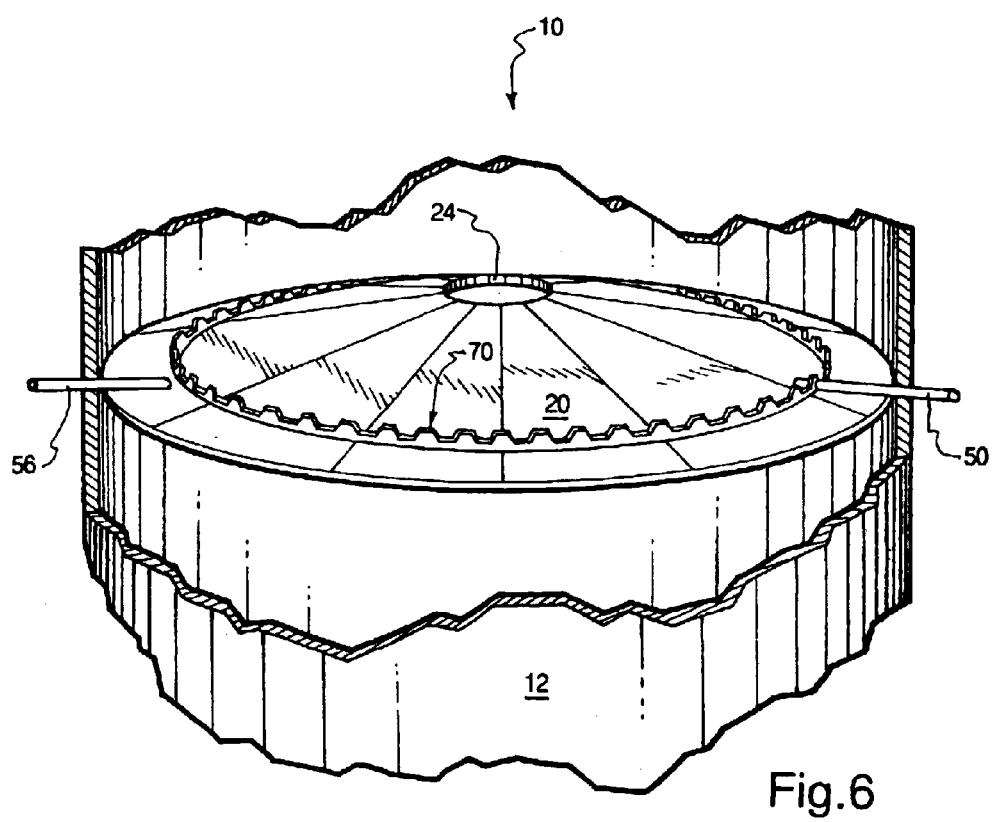
FIG. 6 is a partial sectional perspective view of the septum according to the present invention further including a weir wall to assist in separation of solids from the wastewater being treated within the bioreactor.

As shown in FIG. 5, a mixer 60 may be incorporated into the bioreactor 10 according to the present invention. In one embodiment, the mixer 60 comprises a pair of horizontally disposed bars or other members 62 coupled to the auger shaft 34. A plurality of metal chains 64 may be coupled to the horizontal bars 62. The chains 64 hang down into the top of the sludge bed. When the auger shaft 34 is rotated, chains 64 mix the bioreactor contents and prevent a crust from forming at the top of the bioreactor. It is to be understood that the chains 64 may be made of any suitable material and may be of any desirable length. In addition, although the embodiment of FIG. 5 shows the horizontal bars 62 and the chains 64 positioned above septum 20, it is to be understood that this or another type of mixer could be positioned below the septum 20, if desired.

Figure 8:
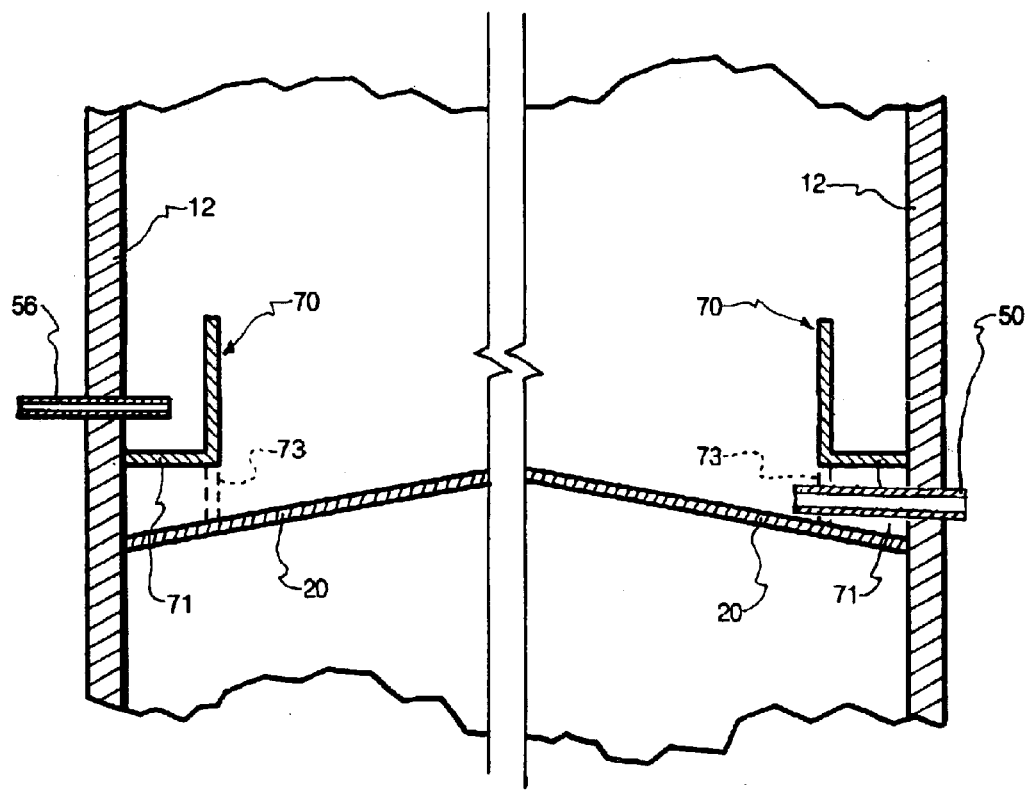
FIG. 8 is a partial sectional side elevation view of the septum and weir wall coupled to the enclosure or vessel according to the present invention.

Still another embodiment of the present invention relates to a weir wall 70 (FIGS. 3, 4, 6, and 8) that is coupled to and extends upwardly from the septum 20. The weir wall 70 is a solid vertical partition or wall that could be six inches high and extend entirely around the perimeter of the tank. The weir wall may, but does not have to, be placed close to the outside wall. As shown in FIG. 8, the weir wall 70 may be secured directly to the vessel wall 12 by a perpendicularly extending wall 71 (i.e., similar to a rain gutter) or, alternatively, by an extension section 73 (shown in dashed lines) that attaches directly to the septum 20.

The purpose of the weir wall is to provide a final mechanism to capture solids that would otherwise escape through effluent port 56. The septum and gravity will, in most cases, retain most of the solids within the bioreactor. Thus, in an ideal configuration only treated water without suspended solids will pass over the weir wall 70 and into effluent pipe 56. The top of the wall comprises a weir of some type, such as a jagged-edge weir, which is the type often used in settling tanks to separate solids from the liquid in which they are suspended. Such a jagged edge of weir wall 70 may include upwardly extending teeth portions 72 and lower trough portions 74. It is to be understood that any tooth configuration may be used on the top of weir wall 70.

The weir wall captures solids that somehow make it past the sludge blanket control mechanism 30 through the central area 24 of septum 20. This may occur because biogas attaches temporarily to some particles making them extremely buoyant. These solids contain a high concentration of bacteria and also contain undigested organic matter. They may be returned to the sludge bed via central aperture 24 in the septum or, alternatively, removed by means of a separate pipe (e.g., return duct 50) and an appropriate recycle pump. Water that passes over the weir wall 70 may be removed from the vessel 12 through effluent pipe 56 for further processing or disposal. It is to be understood that a weir wall 70 may or may not be used in connection with the present invention, depending on the circumstances and the wastewater being treated.

Operation of the induced sludge bed anaerobic reactor will be with a programmable logic controller (PLC) or microprocessor. The computer language will be one unique to PLC and will be understood by those skilled in the relevant art.

Still another aspect of the present invention relates to separation of the various types of bacteria needed for the anaerobic breakdown of organics by forming gradients in the sludge bed. The anaerobic digestion process is complex involving various types of bacteria that work symbiotically, each playing a role in the breakdown of organics. The stages of anaerobic digestion can be broken down into hydrolysis, acidogenesis, and methanogenesis. Specific types of bacteria are required for each stage of the process, and are well known to those skilled in the art. In a properly operating anaerobic digester, hydrolyzing bacteria break down large molecules that are then further broken down by acidogens into volatile organic acids (VOA). VOA is consumed by the methanogens, which produce methane as a byproduct. Acidogens are faster growing than those types of anaerobic bacteria in most situations. This means that most anaerobic digesters must be relatively lightly loaded to prevent the acidogens from outgrowing the methanogens and thus producing more VOA than the methanogens can consume. If they do not, the pH will drop into the acid range, which inhibits methanogens and builds up acid in a downward spiral until no acids are removed and the digester fails. This means that a limited amount of substrate (i.e., organic matter in wastewater) can be added to most anaerobic digesters in any given time period so that processes of hydrolysis and acid production do not outstrip the ability of methanogens to utilize the VOA and thus the pH will be maintained near the neutral range and the system is kept in balance.

Figure 7:
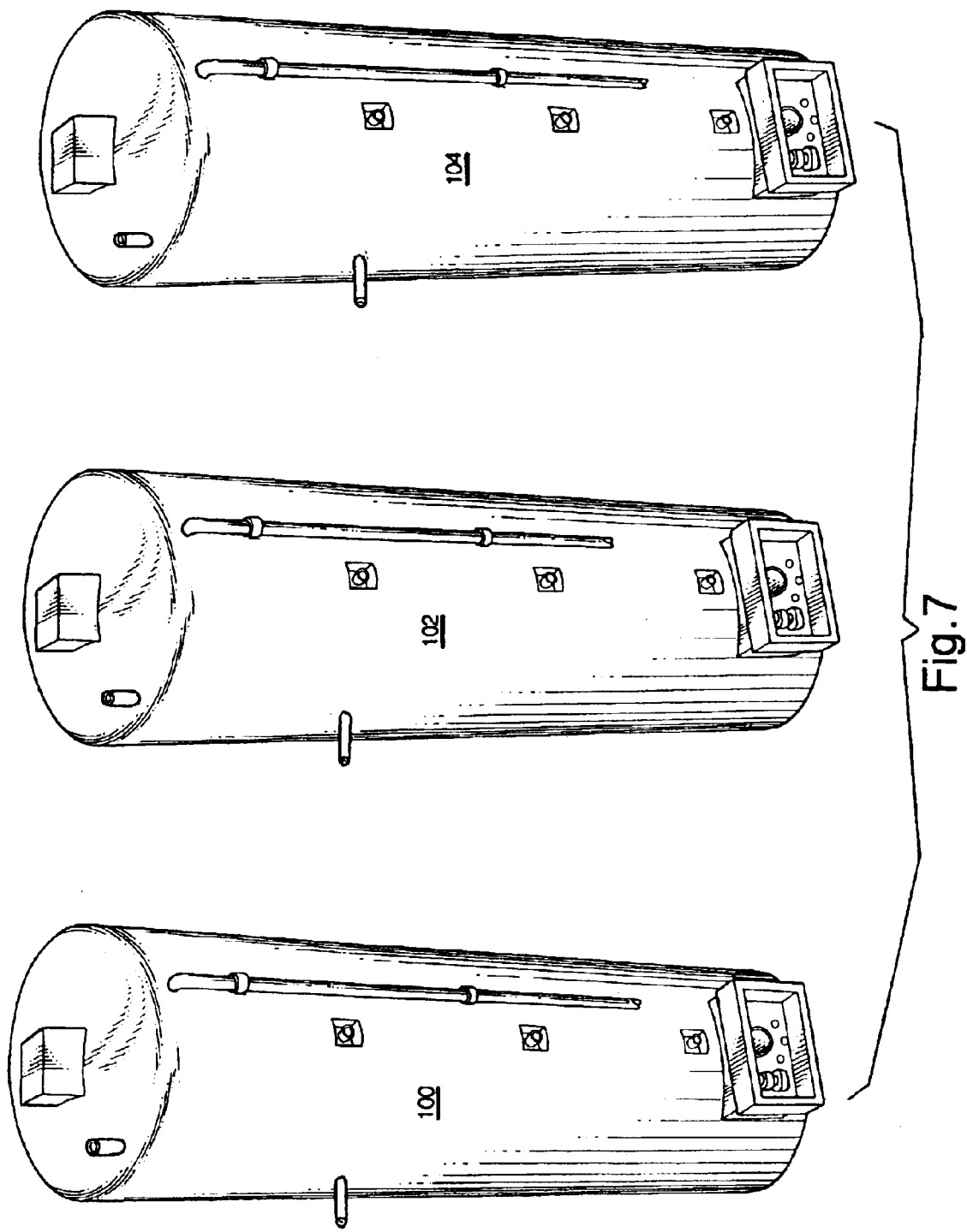
FIG. 7 is a perspective view of multiple tanks for controlling the respective environments for the various stages in the anaerobic process.

A single tank or multiple tanks may be utilized in connection with the induced sludge bed anaerobic reactor system according to the present invention. A multiple tank arrangement (e.g., tanks 100, 102, and 104 in FIG. 7) provides advantages for better separation of bacteria types. The multiple tank arrangement also facilitates easy upscaling, quick startup if the system needs servicing, and easier diagnosis and refurbishment if operating below parity. For example, hydraulic retention time (HRT) is longer and pH is higher in the methane-forming tank. Extensive control mechanisms may be used to maintain different conditions. In a multiple bioreactor tank arrangement, acidogens and methanogens may be captured in a settling basin/weir wall arrangement at the top of each separate bioreactor tank. Captured bacteria are returned to their respective sludge beds.

In the single tank system, the hydrolyzing and acid forming bacteria are captured toward the bottom of the induced blanket. Methanogens are also retained where they grow best, which is above the acidogens in the upper part of the sludge bed in a single tank.

Anaerobic treatment may also be important for the production of usable energy, such as electricity, by utilizing the biogas produced in the anaerobic digestion process as fuel in an engine generator.

While this invention has been described with reference to certain specific embodiments and examples, those skilled in the art will recognize that many variations are possible without departing from the scope and spirit of this invention. The invention, as defined by the claims, is intended to cover all changes and modifications of the invention which do not depart from the spirit of the invention. The words "including" and "having," as used in the specification, including the claims, shall have the same meaning as the word "comprising."

What is claimed is:

1. An induced sludge blanket anaerobic reactor, comprising:
   a vessel;
   an inlet coupled to the vessel, the inlet introducing wastewater into the vessel;
   an outlet coupled to the vessel, the outlet directing wastewater to the outside of the vessel;
   a septum positioned within the vessel to maintain solid particles below the septum;
   wherein the septum is cone shaped and slopes upwardly from a vessel sidewall upward toward a central apex.

2. An induced sludge blanket anaerobic reactor according to claim 1, further comprising:
   a central aperture formed in the septum;
   an auger operatively coupled to the vessel and positioned within the central aperture to move solid particles away from the central aperture.

3. An induced sludge blanket anaerobic reactor according to claim 1 wherein the septum is positioned approximately 1/3 of the way down in the vessel.

4. An induced sludge blanket anaerobic reactor according to claim 1 wherein the septum is rigid.

5. An induced sludge blanket anaerobic reactor according to claim 1 wherein the septum is semi-rigid.

6. An induced sludge blanket anaerobic reactor according to claim 1, further comprising:
   a central aperture formed in the septum;
   an auger operatively coupled to the vessel and positioned within the central aperture to move solid particles away from the central aperture;
   a mixer attached to the auger shaft to mix the wastewater within the reactor.

7. An induced sludge blanket anaerobic reactor according to claim 1, further comprising:
   a central aperture formed in the septum;
   an auger operatively coupled to the vessel and positioned within the central aperture to move solid particles away from the central aperture;
   wherein the auger comprising a shaft, and further comprising a mixer attached to the auger shaft to mix the wastewater within the reactor;
   wherein the mixer comprises a plurality of chains.

8. An induced sludge blanket anaerobic reactor according to claim 1, further comprising a wall coupled to and extending upwardly from the septum, the wall separating solids and liquids from the bioreactor wastewater.

9. An induced sludge blanket anaerobic reactor, comprising:
   a vessel;
   an inlet coupled to the vessel, the inlet introducing wastewater into the vessel;
   an outlet coupled to the vessel, the outlet directing wastewater to the outside of the vessel;
   a septum positioned within the vessel to maintain solid particles below the septum;
   a sludge blanket control mechanism coupled to the vessel, the sludge control mechanism forcing solids down to a bottom zone of the vessel beneath the septum or alternatively above the septum for removal from the vessel;
   wherein the septum is cone shaped and slopes from a vessel sidewall upward toward a central apex.

10. An induced sludge blanket anaerobic reactor according to claim 9 wherein the sludge blanket control mechanism comprises an auger.

11. An induced sludge blanket anaerobic reactor according to claim 9, further comprising:
    a central aperture formed in the septum;
    wherein the sludge blanket control mechanism comprises an auger, the auger being operatively coupled to the vessel and positioned within the central aperture to move solid particles relative to the central aperture in the septum.

12. An induced sludge blanket anaerobic reactor according to claim 9 wherein the septum is positioned approximately 1/3 of the way down in the vessel.

13. An induced sludge blanket anaerobic reactor according to claim 9 wherein the septum is rigid.

14. An induced sludge blanket anaerobic reactor according to claim 9 wherein the septum is semi-rigid.

15. An induced sludge blanket anaerobic reactor according to claim 9, further comprising:
    a central aperture formed in the septum;
    wherein the sludge blanket control mechanism comprises an auger, the auger being operatively coupled to the vessel and positioned within the central aperture to move solid particles relative to the central aperture;
    a mixer operatively coupled to the vessel to mix the wastewater within the vessel.

16. An induced sludge blanket anaerobic reactor, comprising:
    a vessel;
    an inlet coupled to the vessel, the inlet introducing wastewater into the vessel;
    an outlet coupled to the vessel, the outlet directing wastewater to the outside of the vessel;
    a septum positioned within the vessel to maintain solid particles below the septum;
    a sludge blanket control mechanism coupled to the vessel, the sludge control mechanism forcing solids down to a bottom zone of the vessel beneath the septum or alternatively above the septum for removal from the vessel;
    a central aperture formed in the septum;
    wherein the sludge blanket control mechanism comprises an auger, the auger being operatively coupled to the vessel and positioned within the central aperture to move solid particles relative to the central aperture wherein the auger comprising a shaft, and further comprising a mixer attached to the auger shaft to mix the wastewater within the vessel;

wherein the mixer comprises a plurality of variable length, free hanging chains.

17. An induced sludge blanket anaerobic reactor, comprising:

a vessel;

an inlet coupled to the vessel, the inlet introducing wastewater into the vessel;

an outlet couplet to the vessel, the outlet directing wastewater to the outside of the vessel;

a septum positioned within the vessel to maintain solid particles below the septum;

a sludge blanket control mechanism coupled to the vessel, the sludge control mechanism forcing solids down to a bottom zone of the vessel beneath the septum or alternatively above the septum for removal from the vessel;

a wall coupled to and extending upwardly from the septum, the wall separating solids and liquids from the wastewater.

18. A method of controlling a sludge bed in an anaerobic reactor, comprising:

providing a vessel to hold wastewater;

providing an inlet coupled to the vessel, the inlet introducing wastewater into the vessel;

providing an outlet coupled to the vessel, the outlet directing wastewater to the outside of the vessel;

providing a septum positioned within the vessel;

the septum assisting to maintain solid particles in a lower zone of the vessel below the septum.

19. The method of claim 18, further comprising:

providing a sludge blanket control mechanism;

controlling the amounts of solids retained inside the vessel to enhance anaerobic digestion.

20. A method of controlling a sludge bed in an anaerobic reactor, comprising:

providing a vessel to hold wastewater;

providing an inlet coupled to the vessel, the inlet introducing wastewater into the vessel;

providing an outlet coupled to the vessel, the outlet directing wastewater to the outside of the vessel;

providing a septum positioned within the vessel;

the septum assisting to maintain solid particles in a lower zone of the vessel below the septum;

providing a central aperture in the septum;

providing an auger operatively coupled to the vessel and positioned within the central aperture of the septum to move solids contained in the wastewater relative to the septum and thereby control the amount of solids retained in the vessel.

21. A method of controlling a sludge bed in an anaerobic reactor, comprising:

providing a vessel to hold wastewater;

providing an inlet coupled to the vessel, the inlet introducing wastewater into the vessel;

providing an outlet coupled to the vessel, the outlet directing wastewater to the outside of the vessel;

providing a septum positioned within the vessel;

the septum assisting to maintain solid particles in a lower zone of the vessel below the septum;

providing a central aperture in the septum;

providing an auger operatively coupled to the vessel and positioned within the central aperture of the septum to move solids contained in the wastewater relative to the septum and thereby control the amount of solids retained in the vessel;

providing a mixer operatively coupled to the vessel;

mixing a top layer of the sludge bed with the mixer to prevent a crust from forming.

22. A method of processing wastewater through anaerobic digestion, comprising:

providing a vessel to hold wastewater;

providing a septum to hold solids within the wastewater in a lower zone of the vessel;

providing a sludge blanket control mechanism to move solids relative to the septum to control the amount of solids retained within the vessel;

forming a plurality of gradients within the vessel to separate various bacteria formed in the vessel for anaerobic digestion.

23. The method of claim 22 wherein the gradients formed for the various bacteria correspond to stages of anaerobic digestion, comprising hydrolysis, acidogenesis, and methanogenesis.

24. A method of processing wastewater through anaerobic digestion, comprising:

providing a first vessel to carry out hydrolysis in wastewater to be treated;

providing a second vessel to carry out acidogenesis in the wastewater;

providing a third vessel to carry out methanogenesis in the wastewater;

wherein the first, second, and third vessels each comprise a septum to maintain solids in a lower zone of the respective vessels to enhance anaerobic digestion.

25. A method of processing wastewater through anaerobic digestion, comprising:

providing a first vessel to carry out hydrolysis in wastewater to be treated;

providing a second vessel to carry out acidogenesis in the wastewater;

providing a third vessel to carry out methanogenesis in the wastewater;

wherein the first, second, and third vessels each comprise a septum to maintain solids in a lower zone of the respective vessels to enhance anaerobic digestion, and wherein each of the vessels comprise a sludge blanket control mechanism to move solids relative to the septum.

26. A method of processing wastewater through anaerobic digestion, comprising:

providing a first vessel to carry out hydrolysis in wastewater to be treated;

providing a second vessel to carry out acidogenesis in the wastewater;

providing a third vessel to carry out methanogenesis in the wastewater;

wherein the first, second, and third vessels each comprise a septum to maintain solids in a lower zone of the respective vessels to enhance anaerobic digestion, and wherein each of the vessels comprise a sludge blanket control mechanism to move solids relative to the septum, and further comprising maintaining in each vessel conditions to enhance the respective processes of hydrolysis, acidogenesis, and methanogenesis in treating the wastewater.

27. An induced sludge blanket anaerobic reactor, comprising:

a vessel;

an inlet coupled to the vessel, the inlet introducing wastewater into the vessel;

an outlet coupled to the vessel, the outlet directing wastewater to the outside of the vessel;

a septum submerged in a liquid disposed within the vessel;

wherein the septum comprises a central apex and a surface sloping radially downward toward sidewalls of the closed vessel.

28. An induced sludge blanket anaerobic reactor according to claim 27 wherein the septum comprises a central aperture allowing fluid flow but not solids movement therethrough.

29. An induced sludge blanket anaerobic reactor according to claim 27 wherein the liquid is effluent covering the septum.

30. An induced sludge blanket anaerobic reactor, comprising:

a vessel;

an inlet coupled to the vessel, the inlet introducing wastewater into the vessel;

an outlet coupled to the vessel, the outlet directing wastewater to the outside of the vessel;

a septum submerged in a liquid disposed within the vessel;

an auger extending through a central aperture of the septum, wherein the auger extends below lower extents of the septum.

31. An induced sludge blanket anaerobic reactor, comprising:

a closed vessel;

an inlet coupled to the closed vessel, the inlet introducing wastewater into the closed vessel;

an outlet coupled to the closed vessel, the outlet directing wastewater to the outside of the closed vessel;

a septum dividing the vessel into to two portions, the septum allowing fluid flow but not solid particle movement between the two portions;

a weir wall extending from the septum and spaced from a sidewall of the closed vessel;

wherein the weir wall forms a closed circle.

32. A method of treating wastewater, comprising:

providing a vessel to hold wastewater;

providing an inlet coupled to the vessel, the inlet introducing wastewater into the vessel;

providing an outlet coupled to the vessel, the outlet directing wastewater to the outside of the vessel;

providing a septum positioned within the vessel;

maintaining solid particles in a lower zone of the vessel below the septum;

allowing gasses to pass through the septum from the lower zone to an upper zone of the vessel.

* * * * *